Sept. 28, 1965  E. A. EDWARDS ETAL  3,208,685
ANTI-FRICTION DISK FOR STRIP MATERIAL CARTRIDGE
Filed Dec. 30, 1963  2 Sheets-Sheet 1

EVAN A. EDWARDS
ARCHIE J. TUCKER
INVENTORS

BY
ATTORNEYS

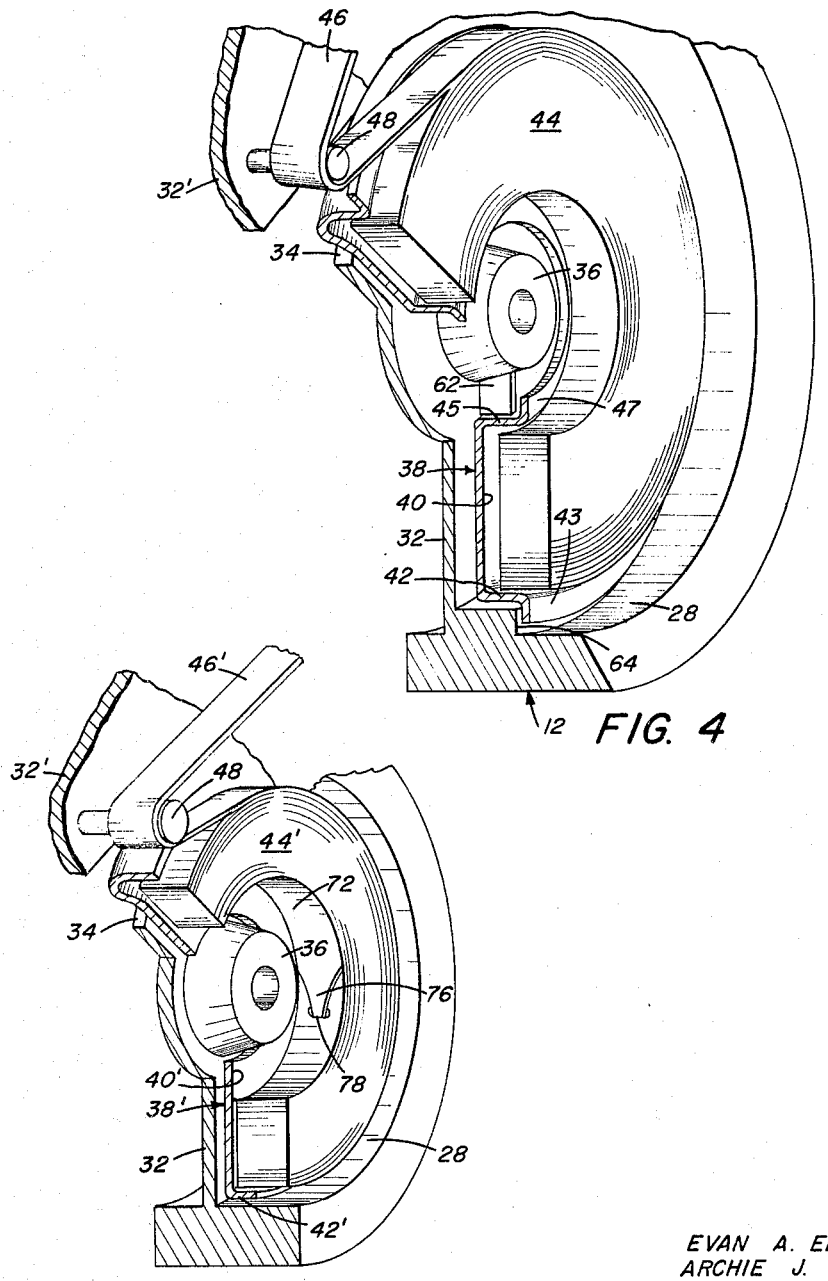

United States Patent Office 3,208,685
Patented Sept. 28, 1965

3,208,685
ANTI-FRICTION DISK FOR STRIP MATERIAL CARTRIDGE
Evan A. Edwards and Archie J. Tucker, Rochester, N.Y., asignors to Eastman Kodak Company, Rochester, N.Y., a corporation of New Jersey
Filed Dec. 30, 1963, Ser. No. 334,206
15 Claims. (Cl. 242—71.2)

The present invention relates to a motion picture film cartridge and more particularly to a motion picture film cartridge of the type having a coreless film supply.

Motion picture film cartridges adapted to be inserted into cinematographic apparatus are well known in the art and are generally loaded with film, perforated along at least one edge, which moves in a path from the supply, past an exposure aperture to a take-up reel. When the cartridge is properly inserted into the cinematographic apparatus, a film advancing claw in the apparatus is positioned to engage the perforations of the film and a take-up drive carried by the apparatus is operatively coupled to the take-up reel. In response to actuation of a suitable control mechanism in the cinematographic apparatus, the film advancing claw and the take-up drive are simultaneously energized such that the claw intermittently pulls the film from the freely rotatable supply to move successive unit lengths of the film past the exposure aperture and the take-up drive rotates the core of the take-up reel to wind film thereon.

It has been found that in handling a film cartridge, both before and after it is inserted into cinematographic apparatus, the coiled film contained therein has a tendency to clockspring when the cartridge is subjected to sharp movements or jarred in any manner. The term "clockspringing" as used herein means the radial displacement of successive outer convolutions of a roll of web material relative to the central axis thereof, caused by the tendency of the coiled web to unwind.

Generally, because the coil or roll of film in the supply chamber is not confined therein to a particular diameter, and, as the film has the inherent tendency to clockspring and increase the diameter of the coil, the outer convolution very often slidably contacts the walls of the supply chamber. The combined inertia and friction forces of the film in the supply chamber largely determine the hold back force that the claw must overcome before it can smoothly advance the film a unit length past the exposure aperture. Thus, when the film slidably engages the walls of the supply chamber, the friction forces can become excessive, resulting in unsteady film registration in the exposure aperture and erratic apparatus and cartridge operation.

An object of this invention is to provide a cartridge for flexible strip feeding apparatus with a simple anti-friction means for minimizing the forces opposing the unwinding of the strip from the supply.

Another object of this invention is to provide a film cartridge for cinematographic apparatus with means for preventing the outer convolution of the supply roll of film from clockspringing into contact with the peripheral walls of the supply chamber.

Still another object of this invention is to provide a film cartridge for cinematographic apparatus which will permit the film to be readily withdrawn from the supply chamber.

Other objects and a fuller understanding of the invention can be had by referring to the following description and claims taken in conjunction with the accompanying drawings in which:

FIG. 4 is a perspective view, partially in section, taken substantially along the line 4—4 of FIG. 2, illustrating the anti-friction means of our invention; and FIG. 5 is a perspective view partially in section showing another embodiment of the invention.

Figure 1:
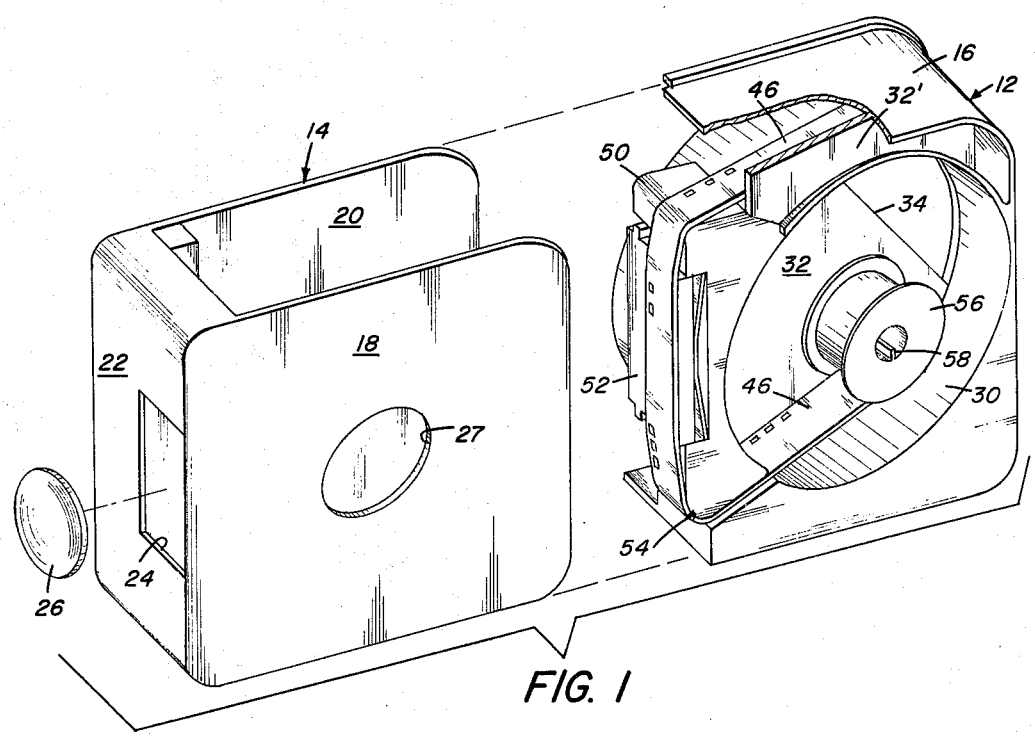
FIG. 1 is an exploded perspective view of a loaded film cartridge constructed in accordance with one embodiment of our invention.

In order to facilitate the understanding of the operation and construction of the apparatus, a brief summary of the invention will be helpful. A perforated filmstrip or film is spirally coiled within a supply chamber of a film cartridge with its leader end guided in a path from the supply chamber to a suitable take-up core or reel. Friction-reducing means, which, in the preferred embodiments comprises a rotatable flexible disk having a diameter greater than the diameter of the coiled film, is positioned coaxially relative to the coiled film. The disk includes a raised lip about its circumference for preventing the coiled roll of film from expanding radially and engaging the walls of the supply chamber. The disk can also be provided with a circular raised lip adjacent its center for maintaining the innermost convolution of the film at a minimum diameter and thus prevent the coiled film from cinching on a hub about which it rotates. By means of this structure, when the film is used in cinematographic apparatus and the filmstrip is being tangentially unwound from the supply roll and moved from the supply chamber, the edge of the filmstrip will slidably engage the lip and deflect that portion of the flexible disk out of its normal plane. At the same time that portion of the circumferential disk that has not been deflected prevents the coiled roll from expanding radially as the result of clockspringing.

For purposes of illustration, we have shown our invention applied to a motion picture film cartridge of the type which includes both a film supply and a take-up chamber. Thus, referring to the drawings, and more particularly to FIGS. 1–4, the film cartridge 10 comprises a body 12 and a matching cover 14. An edgewall 16, embracing three sides of body 12, cooperates with sidewalls 18 and 20, and facewall 22, respectively, of cover 14, such that body 12 and cover 14, by virtue of their assembly, form a substantially light-tight housing. When cartridge 10 is properly loaded into cinematographic apparatus (not shown), an exposure aperture 24 in facewall 22 is in alignment with a lens system 26 forming part of the apparatus, and a circular opening 27 in sidewall 20 receives a take-up drive member (not shown) of the cinematographic apparatus.

Body 12 includes a cylindrically recessed supply chamber 28 and a cylindrically recessed take-up chamber 30 formed on opposite sides of the body and substantially in coaxial alignment with each other. A common wall 32, which has a segmental opening 34, forms the bottom of both supply chamber 28 and take-up chamber 30. A shoulder 64, spaced a given distance axially of the supply chamber from wall 32, is formed in that portion of the circular wall of supply chamber 28 that does not overlie opening 34. A conical locating boss 36 is formed on wall 32 substantially at its center and projects into supply chamber 28.

Figure 2:
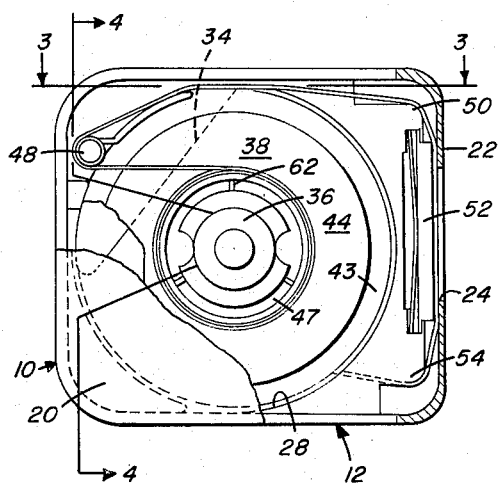
FIG. 2 is a side view of the body of the film cartridge looking at the supply side and with certain parts broken away to better show the construction.
Figure 3:
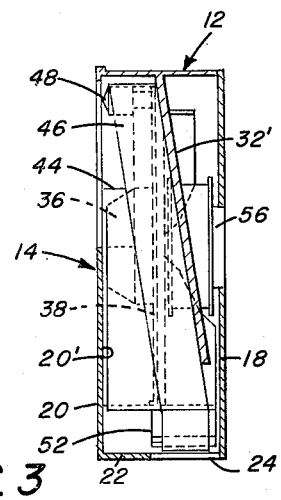
FIG. 3 is a cross sectional view of an assembled film cartridge taken substantially along the line 3—3 of FIG. 2 and rotated 90° clockwise with respect to the positions shown in FIG. 2.

In accordance with the present invention, and as best shown in FIGS. 2–4, a flexible, annular, anti-friction disk 38, having an outside diameter slightly less than the diameter of cylindrical supply chamber 28 and an inside diameter slightly greater than the diameter of boss 36, is coaxially positioned on boss 36 and is mounted for rotation thereabout, in a plane substantially perpendicular to the axis of boss 36. The outer periphery of disk 38, which is formed by drawing a plastic sheet in the preferred embodiment, is formed to provide a lip 42 and an outwardly turned rim 43, surrounding the flat tray portion 40; whereas, the inner periphery of disk 38 is formed to provide a lip 45 and an inwardly turned rim 47 (see FIG. 4). Disk 38 is rotatably supported within supply chamber 28 by a plurality of bearing surfaces 62 (only one of which is shown in FIG. 4) extending radially from, and spaced circumferentially around, boss 36 and which surfaces slidably contact lip 45 and rim 47 thereon. Although the plurality of bearing surfaces 62 extend radially from and are spaced around boss 36 in order to rotatably support disk 38, it will be recognized as being within the scope of the invention that the boss could also be cylindrical in the area of support rather than having a plurality of separate bearing surfaces. The inner face of rim 43 of disk 38 overlies shoulder 64 to support and prevent lip 42 from being deflected and thus allowing the outer convolution of coil 44 to override rim 43. Thus, disk 38 is positioned within supply chamber 28 such that, whether it rotates or remains stationary, a segment of the flat tray portion 40, including an arcuate portion of lip 42 and rim 43, will overlie and be in registry with opening 34.

A coreless roll or coil 44 of film strip 46 is placed in supply chamber 28 coaxial to boss 36 such that its innermost spirally wound edge lies against the flat tray 40 of disk 38, and its outermost spirally wound edge lies in a plane substantially parallel to and closely adjacent to the surface 20' of wall 20 of the cover 14. By means of this structure, the spirally wound convolutions of the coil are prevented from being displaced axially of the roll relative to one another by an amount which might cause jamming of the filmstrip within supply chamber 28. Lip 42 of disk 38 will overhang the marginal portion of the outer convolution of the coiled film 44 and prevent the outer flat surface thereof from slidably engaging the peripheral wall of supply chamber 28. Similarly, lip 45 will prevent the innermost convolution of roll 44 from cinching around boss 36 and thereby preventing the coreless roll of film from rotating as filmstrip 46 is withdrawn from supply chamber 28.

Filmtsrip 46 is tangentially withdrawn from the outer convolution of the roll along a path lying substantially in the plane of the roll and is carried over a rotatable snubber 48 journaled on body 12 adjacent to the center of the arc forming one side of segment opening 34. The filmstrip 46, as it is tangentially unwound from roll 44, will exit from chamber 28 in a path which will be in registry with opening 34 regardless of whether it is being unwound from a full roll of film or from a substantially empty roll of film. Filmstrip 46 is sufficiently rigid in an edgewise direction that, as it is drawn along its path, its edge will ride over lip 42 and rim 43 of disk 38 and deflect that portion of the disk 38 in registry with opening 34 out of its normal plane and into the opening. As best shown in FIG. 3, film 46 is guided from supply chamber 28 across the top of body 12 in a passageway formed by wall 20 of the cover 14 and wall 32' of the body canted with respect to the wall 32, such that the path of the film is offset out of the plane of rotation of coiled film 44 in supply chamber 28 and crosses over into alignment with take-up chamber 30.

As viewed in FIG. 1, filmstrip 46 passes over an upper channeled snubber 50, across a pressure pad 52, to a lower channeled snubber 54 where it is guided into take-up chamber 30 and attached to take-up chamber 30 and 56 is centrally disposed within take-up chamber 30 and is rotatably mounted on wall 32 for winding successive convolutions of film thereupon. When cover 14 is assembled to body 12, the take-up core 56 is aligned with circular opening 27 so that a drive member (not shown) of the cinematographic apparatus can be drivingly coupled to drive key 58 of core 56 when the cartridge is loaded into the apparatus. At the same time aperture 24 of facewall 22 will be so positioned that an intermittent feed claw (not shown) of the apparatus can extend through the aperture to engage the film perforations and intermittently advance the film a unit length at a time over pressure pad 52 when suitable control mechanism of the apparatus is actuated.

To better understand the operation of the invention as shown in FIGS. 1–4, let us assume initially that cartridge 10 is loaded into cinematographic apparatus such that a claw and drive member therefor (not shown) are operatively coupled to the film cartridge for the purpose of moving film past the exposure aperture 24 from supply chamber 28 to take-up chamber 30. Normally when film is initially coiled into a supply roll 44, adjacent convolutions thereof tend to adhere to each other so that when the coiled roll 44 of film is first inserted into supply chamber 28 the outer convolution of the rolled film is positioned well within the outer periphery of disk 38. The supply roll of film will generally retain this configuration and as the film 46 is pulled from supply chamber 28 to take-up chamber 30, the roll 44 will rotate about its axis about boss 36. Under these conditions disk 38 will normally remain stationary and act as a fixed part of wall 32 since the frictional forces acting between rims 43 and 47 of disk 38 and their respective supports (bearing surfaces 62 and shoulder 64 of body 12) will normally be greater than the frictional forces exerted between the spirally wound edge of rolled film 44 and tray portion 40 of the disk 38. That segmental portion of disk 38 which is in registry with opening 34 in wall 32 will be deflected into the opening by the edge of the film, thereby permitting the film to be tangentially withdrawn from the roll and along its path about rotatable snubber 48. Obviously, the area of contact between disk 38 and wall 32 can be chosen to produce the desired friction.

If, however, the coiled roll of film 44 becomes clocksprung for some reason, disk 38 will rotate about boss 36 with the roll 44 because the outer flat surface of the outermost convolution of film will now slidably engage the inner surface of lip 42, and a frictional force will be generated therebetween which becomes greater than the frictional force acting between rims 43 and 47 of disk 38 and their respective supports (bearing surface 62 and shoulder 64 of body 12). As disk 38 rotates with the coil of film 44, that portion of the disk in registry with opening 34 at any particular instant will be deflected by filmstrip 46 into opening 34, thus permitting the film to be withdrawn from supply chamber 28. Lip 42 of disk 38 will meanwhile prevent the outer convolution of coiled roll 44, which is not in registry with opening 34, from slidably engaging the peripheral walls of supply chamber 28, and thus prevent the coiled film from jamming within supply chamber 28 so that the pulldown mechanism of the cinematographic apparatus cannot properly pull film from the supply roll and feed it past the exposure aperture.

In addition, when the adhesive force between the first few inner convolutions of the roll 44 is overcome, so that these adjacent convolutions can slip relative to each other, there is a tendency for the circumference of the innermost convolution to become progressively smaller. As best shown in FIG. 4, when the innermost convolution becomes progressively smaller, the innermost convolution will eventually cinch on lip 45 of disk 38 and cause disk 38 to rotate until all of the film has been withdrawn from supply chamber 28. Therefore, the anti-friction disk 38 confines the supply roll of film and isolates it from direct engagement with the stationary parts of the supply chamber as the result of clockspringing of the outer convolution and/or cinching of the inner convolution and thereby prevents the film from being subjected to a frictional drag which would impede the film claw from readily pulling film from the supply roll.

Another embodiment of the invention is illustrated in

FIG. 5 wherein a slightly modified flexible annular disk 38′ is coaxially positioned about boss 36. Disk 38′ has an outside diameter slightly less than the diameter of cylindrical supply chamber 28 and an inside diameter slightly greater than the diameter of boss 36. In this embodiment, annular tray portion 40′ rests against the surface of flat wall 32. The outer periphery of disk 38′ is formed to provide a lip 42′. The trailing end 72 of the film forms the innermost convolution of the coreless coil of film 44. The extreme end of the trailing end is formed into a pointed tongue 76 which tongue is adapted to cooperate with a hole 78 punched in the trailing end 72 of the film spaced longitudinally from pointed end 76 a distance somewhat greater than the circumference of boss 36. It will be readily recognized that the extreme end of tongue 76 need not be pointed so long as it is small enough to cooperate with hole 78. Thus, if the trailing end 72 of the film tends to cinch about boss 36, tongue 76 will engage hole 78 and prevent the innermost convolution of the coil from cinching down into engagement with the boss 36.

The operation of this FIG. 5 embodiment is similar to the operation of the previously described embodiment. As the outermost convolution of the coiled roll of film 44′ is tangentially unwound, anti-friction disk 38′ normally remains stationary and that segmental portion of the disk which is in registry with opening 34 in the wall 32 will be deflected into the opening and permit the leading end 46′ of the film to be easily withdrawn from supply chamber 28. If, however, coil 44′ is clocksprung so that the outer convolution thereof frictionally engages the lip 42′, the disk 38′ will rotate about boss 36 but that portion of disk 38′ in registry with opening 34 at any instant will still be deflected by leading end 46′ in a manner similar to that of the first embodiment. The non-deflectable portion of lip 42′ will, meanwhile, prevent the outer convolution of coiled film 44′ from slidably engaging the walls of supply chamber 28.

While not specifically illustrated, boss 36 could include a freely rotatable member upon which the innermost convolution of the coil of film 44′ would cinch and thus eliminate the need for the tongue 76 and hole 78 of the embodiment illustrated in FIG. 5, or for the inner lip 45 of the FIG. 4 embodiment.

The invention has been disclosed hereinabove with each of the embodiments having a portion of the disk deflected into an opening or recess adjacent the path of the filmstrip as it is tangentially unwound from the coiled roll of film. Obviously the disk or its support could be modified in such a way as to normally space the tray portion 40 of the disk 38 from the common wall 32 and thus permit the rim portion of the tray to be deflected from its normal plane without requiring a definite recess or opening in the wall 32 for this purpose. The lip of the disk thus can be moved out of the path of the filmstrip as it is tangentially withdrawn from the coiled roll of film. While we have shown this as a continuous lip, it should be pointed out that the lip can be discontinuous with suitable camming surfaces on each portion.

While the invention has been particularly described with reference to a film cartridge, the invention is equally applicable to other flexible strip handing apparatus, such as a tape supply for a recorder and/or playback device, wherein a web is moved from a supply chamber to a take-up means.

The invention has been described in detail with particular reference to embodiments thereof, but it will be understood that variations and modifications can be effected within the spirit and scope of the invention as described hereinabove and as defined in the appended claims.

We claim:

1. In a cartridge having a supply chamber formed by peripheral and side walls for receiving a supply coil of flexible strip material so that said strip material can be withdrawn from the outer periphery of said supply coil, the improvement comprising:
   rotatable means for receiving said supply coil in coaxial relationship therewith and having a surface engaging an edge of the convolutions forming said supply coil and providing friction-reducing separation between said edge and an adjacent side wall of the supply chamber,
   at least a peripheral portion of said rotatable means tending to extend into the normal path of withdrawal of said strip material and being sufficiently flexible in an axial direction relative to said supply coil so as to be deflected out of its normal plane of rotation by engagement of an edge of said strip material with said portion as the strip material is withdrawn from said supply coil.

2. A cartridge structure according to claim 1 wherein said rotatable means has a surface overhanging the marginal portion of the outer peripheral surface of the outer convolution of said supply coil to retain said supply coil against expansion radially into engagement with a peripheral wall of said supply chamber.

3. A cartridge structure according to claim 2 wherein said rotatable means is a disk and said surface is on a portion of the disk extending from the circumference of the disk in an axial direction for encircling said marginal portion of the outer convolution of said supply coil.

4. A cartridge structure according to claim 1 wherein said rotatable means comprises an annular disk, the inner circumference of which is less than the inner circumference of said supply coil and the outer circumference of which is greater than the initial outer circumference of said coil.

5. In a cartridge having a supply chamber formed by peripheral and side walls for receiving a supply coil of flexible strip material so that said strip material can be withdrawn from the outer periphery of said supply coil, the improvement comprising:
   an annular disk for receiving said supply coil in coaxial relationship therewith, the inner circumference of said disk being less than the inner circumference of said supply coil and the outer circumference of said disk being greater than the initial outer circumference of said supply coil,
   said annular disk having a surface engaging an edge of the convolutions forming said supply coil and providing friction-reducing separation between said edge and an adjacent side wall of said supply chamber, and having a surface overhanging a marginal portion of the outer peripheral surface of the outer convolution of said supply coil to retain the supply coil against expansion radially into engagement with a peripheral wall of said supply chamber,
   and a stationary boss located within said supply chamber, said annular disk and said supply coil being disposed coaxially with said stationary boss for rotation independently of each other around said boss.

6. A cartridge structure according to claim 5 wherein at least a peripheral portion of said annular disk tends to extend into the normal path of withdrawal of said strip material and is sufficiently flexible in an axial direction relative to said supply coil so as to be deflected out of the normal plane of rotation of said disk by engagement of an edge of said strip material with said portion as the strip material is withdrawn from said supply coil.

7. A cartridge structure according to claim 5 wherein said stationary boss has bearing surface means for engageably supporting said annular disk for free rotation of the disk around said boss.

8. In a cartridge having a supply chamber formed by peripheral and side walls for receiving a supply coil of flexible strip material so that said strip material can be withdrawn from the outer periphery of said supply coil, the improvement comprising:
   an annular disk for receiving said supply coil in coaxial relationship therewith, the inner curcumference of said disk being less than the inner circumference of said supply coil and the outer circumference of said disk being greater than the initial outer circumference of said supply coil, said annular disk being rotatably mounted within said chamber and having a surface engaging an edge of the convolutions forming said supply coil and providing friction-reducing separation between said edge and an adjacent side wall of said supply chamber, and an outer lip member about the periphery of said outer circumference and provided with a surface overhanging a marginal portion of the outer peripheral surface of the outer convolution of said supply coil to retain the supply coil against expansion radially into engagement with a peripheral wall of said supply chamber, said outer lip member including an outer rim member lying in a plane substantially perpendicular to the axis of said supply coil, and shoulder means formed in said peripheral wall for slidably engaging said outer rim member.

9. A cartridge structure according to claim 8 wherein a stationary boss is located within said supply chamber and said staionary boss has bearing surface means for supporting said annular disk for free rotation of the disk around said boss.

10. In a cartridge having a supply chamber formed by peripheral and side walls for receiving a supply coil of flexible strip material so that said strip material can be withdrawn from the outer periphery of said supply coil, the improvement comprising:

an annular disk for receiving said supply coil in coaxial relationship therewith, the inner circumference of said disk being less than the inner circumference of said supply coil and the outer circumference of said disk being greater than the initial outer circumference of said supply coil, said annular disk having a surface engaging an edge of the convolutions forming said supply coil and providing friction-reducing separation between said edge and an adjacent side wall of said supply chamber, a first lip member about the periphery of said inner circumference, and a second lip member about the periphery of said outer circumference and which is provided with a surface overhanging a marginal portion of the outer peripheral surface of the outer convolution of said supply coil to retain the supply coil against expansion radially into engagement with a peripheral wall of said supply chamber, said first and second lip members including first and second rim members, respectively, each lying in a plane substantially perpendicular to the axis of said supply coil, and means located in said supply chamber for rotatably supporting said disk by slidably engaging said first and second rim members, respectively.

11. A film cartridge structure according to claim 10 wherein a stationary boss is located within said supply chamber and said means for rotatably supporting said disk includes a plurality of bearing surfaces spaced about said boss for engaging said first rim member and a shoulder formed in the peripheral wall of said supply chamber for engaging said second rim member.

12. In a cartridge having a supply chamber formed by peripheral and side walls for receiving a supply coil of flexible strip material so that said strip material can be withdrawn from the outer periphery of said supply coil, the improvement comprising:

one of said side walls having a segmental opening therein of predetermined size, and means disposed in said supply chamber and separating said supply coil from said one side wall and partly overlying said segmental opening, said means being freely rotatable relative to said supply coil and said one side wall; at least a peripheral portion of said rotatable means tending to extend into the normal path of withdrawal of said strip material and in registry with said segmental opening at any instant being sufficiently flexible in an axial direction relative to said supply coil so as to be deflected into said opening by engagement of an edge of said strip material with said portion as the strip material is withdrawn from said supply coil.

13. A cartridge structure according to claim 12 wherein said cartridge further has a take-up chamber coaxially aligned in side-by-side relationship with said supply chamber and said one side wall also defines a side wall of said take-up chamber.

14. A cartridge according to claim 12 wherein said means in said supply chamber and said one side wall are in surface-to-surface contact over a preselected area.

15. In a film cartridge adapted for use in cinematographic apparatus having means for selectively advancing a filmstrip in the cartridge in one direction, the combination comprising:

(a) a housing;
(b) a wall member located within said housing for dividing the interior thereof into a supply chamber and a take-up chamber:
    (1) said wall member including an opening communicating into said supply chamber;
(c) a circular boss formed on said wall member and projecting into said supply chamber;
(d) a coiled coreless roll of filmstrip rotatably mounted on said boss with its axis substantially perpendicular to said wall member and said filmstrip tangentially unwound therefrom in a direction substantially perpendicular to said axis and in registry with said opening in said wall member;
(e) an annular disk rotatably mounted on said boss intermediate said coil of filmstrip and said wall member for receiving said coil in coaxial relationship, a part of the outer peripheral portion of said disk overlying said opening,
    (1) a lip member about the outer circumference of said disk for overhanging a marginal portion of the outer peripheral surface of the outer convolution of said coil to retain the coil in said supply chamber against expansion radially into engagement with the peripheral walls of said supply chamber, that part of said disk overlying said opening in said wall member being deflectable out of such overhanging relationship by engagement of an edge of said filmstrip with said part as it is withdrawn from said coil.

References Cited by the Examiner

UNITED STATES PATENTS

| | | | |
|---|---|---|---|
| 2,476,705 | 7/49 | Coutant et al. | 352—156 |
| 2,529,501 | 11/50 | Johnston | 242—71.8 |
| 3,104,848 | 9/63 | Joffe | 242—71.8 |

References Cited by the Applicant

UNITED STATES PATENTS

| | | |
|---|---|---|
| 698,125 | 4/02 | Messter. |
| 1,369,127 | 2/21 | Ray. |
| 2,001,884 | 5/35 | Newman. |
| 2,191,028 | 2/40 | Miller et al. |
| 2,476,705 | 7/49 | Coutant et al. |
| 2,756,940 | 7/56 | Lessler. |
| 2,817,516 | 12/57 | Daniel. |
| 3,015,384 | 1/62 | Kellogg. |
| 3,065,310 | 11/62 | Cross. |

MERVIN STEIN, *Primary Examiner.*